(12) United States Patent
Takiguchi

(10) Patent No.: US 8,849,096 B2
(45) Date of Patent: Sep. 30, 2014

(54) MOVING IMAGE REPRODUCING APPARATUS, MOVING IMAGE REPRODUCING METHOD, AND COMPUTER-READABLE STORAGE MEDIUM STORING PROGRAM

(75) Inventor: Hideo Takiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/365,649

(22) Filed: Feb. 3, 2012

(65) Prior Publication Data
US 2012/0201510 A1 Aug. 9, 2012

(30) Foreign Application Priority Data
Feb. 9, 2011 (JP) .................. 2011-026356

(51) Int. Cl.
*H04N 5/94* (2006.01)
*H04N 9/82* (2006.01)
*H04N 5/76* (2006.01)
*G11B 27/10* (2006.01)
*G11B 27/34* (2006.01)

(52) U.S. Cl.
CPC .............. *H04N 5/76* (2013.01); *H04N 9/8205* (2013.01); *G11B 27/105* (2013.01); *G11B 27/34* (2013.01)
USPC .......................................... 386/248; 386/239

(58) Field of Classification Search
None
See application file for complete search history.

(56) References Cited

U.S. PATENT DOCUMENTS

| 2005/0046900 A1* | 3/2005 | Nakamori | 358/1.18 |
| 2009/0279840 A1* | 11/2009 | Kudo et al. | 386/52 |
| 2009/0322774 A1* | 12/2009 | Hosoi et al. | 345/581 |

FOREIGN PATENT DOCUMENTS

| JP | 2000-209541 A | 7/2000 |
| WO | 01/37560 A1 | 5/2001 |

* cited by examiner

*Primary Examiner* — William C Vaughn, Jr.
*Assistant Examiner* — Eileen Adams
(74) *Attorney, Agent, or Firm* — Canon USA, Inc. IP Division

(57) ABSTRACT

One disclosed aspect of the embodiments relates to a technique, when a moving image file is divided and divisional moving images are reproduced simultaneously in a plurality of display areas, for allowing a user to easily search for a desired scene in the entire moving image more quickly. A moving image reproducing apparatus divides a moving image to generate a plurality of divisional moving images and reproduces the divisional moving images simultaneously. If the user issues an instruction to divide a first divisional moving image that is being reproduced and generate a plurality of second divisional moving images, in response to the instruction, the apparatus acquires a reproduction position of the first divisional moving image. The apparatus starts reproduction of the plurality of second divisional moving images at a position corresponding to the acquired reproduction position.

6 Claims, 8 Drawing Sheets

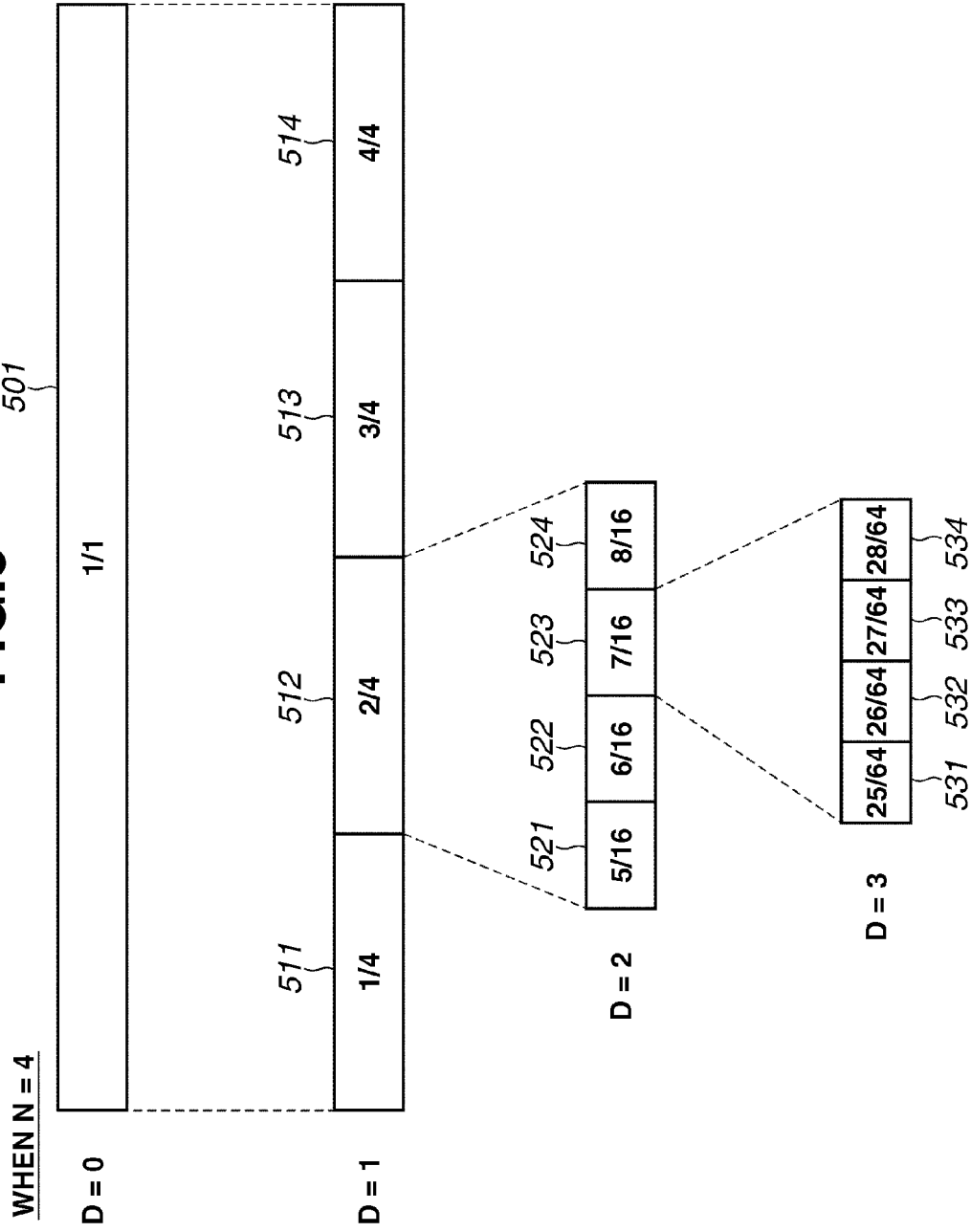

MOVING IMAGE REPRODUCING APPARATUS, MOVING IMAGE REPRODUCING METHOD, AND COMPUTER-READABLE STORAGE MEDIUM STORING PROGRAM

BACKGROUND OF THE INVENTION

1. Field of the Invention

Embodiments of the present invention relate to a technique for dividing a moving image into a plurality of divisional moving images and reproducing the divisional moving images.

2. Description of the Related Art

There is a conventional technique that divides a moving image into a plurality of divisional moving images, and simultaneously displays the divisional moving images in a plurality of display areas for searching for a desired scene in the moving image.

However, based on such conventional technique, if the reproduction time of a moving image is very long, even if the moving image is divided, the reproduction time of each of the divisional moving images is still long. Thus, much time is required to search for a desired scene. In addition, to shorten the reproduction time of each of such divided moving images, a moving image may be divided into many divisional moving images and the divisional moving images may be displayed simultaneously. However, if the number of divisional moving images is increased, the user may not view the moving images easily. Thus, the user may easily miss a desired scene.

SUMMARY OF THE INVENTION

One disclosed aspect of the embodiments is directed to a technique allowing a user to search for a desired scene in a moving image more quickly and easily.

According to an aspect of the embodiments, a moving image reproducing apparatus includes a division unit configured to divide a moving image to generate a plurality of divisional moving images, a reproduction unit configured to reproduce the plurality of divisional moving images simultaneously, a reception unit configured to receive an instruction to divide one of a plurality of first divisional moving images and generate a plurality of second divisional moving images during reproduction of the first divisional moving images, an acquisition unit configured to acquire a reproduction position of the first divisional moving image in response to reception of the instruction for division, a calculation unit configured to calculate time from a beginning position of the second divisional moving image including the acquired reproduction position to the acquired reproduction position of the second divisional moving image, and a control unit configured to control reproduction of the plurality of second divisional moving images by the reproduction unit so that the reproduction starts from a point where the calculated time has elapsed from the beginning of each of the second divisional moving images.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the embodiments.

FIG. 5 illustrates an example of how a moving image file is divided according to the exemplary embodiment.

DESCRIPTION OF THE EMBODIMENTS

Various exemplary embodiments, features, and aspects of the embodiments will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. An operation in a flowchart may be optional. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

A configuration of a computer apparatus constituting an image processing apparatus according to a first exemplary embodiment will be described with reference to a block diagram in FIG. 1. The image processing apparatus may be realized by a single computer apparatus. Alternatively, the image processing apparatus may be realized by distributing various functions to a plurality of computer apparatuses as needed. If a plurality of computer apparatuses are used, these computer apparatuses are connected to each other via a local area network (LAN) or the like to enable mutual communication.

Figure 1:
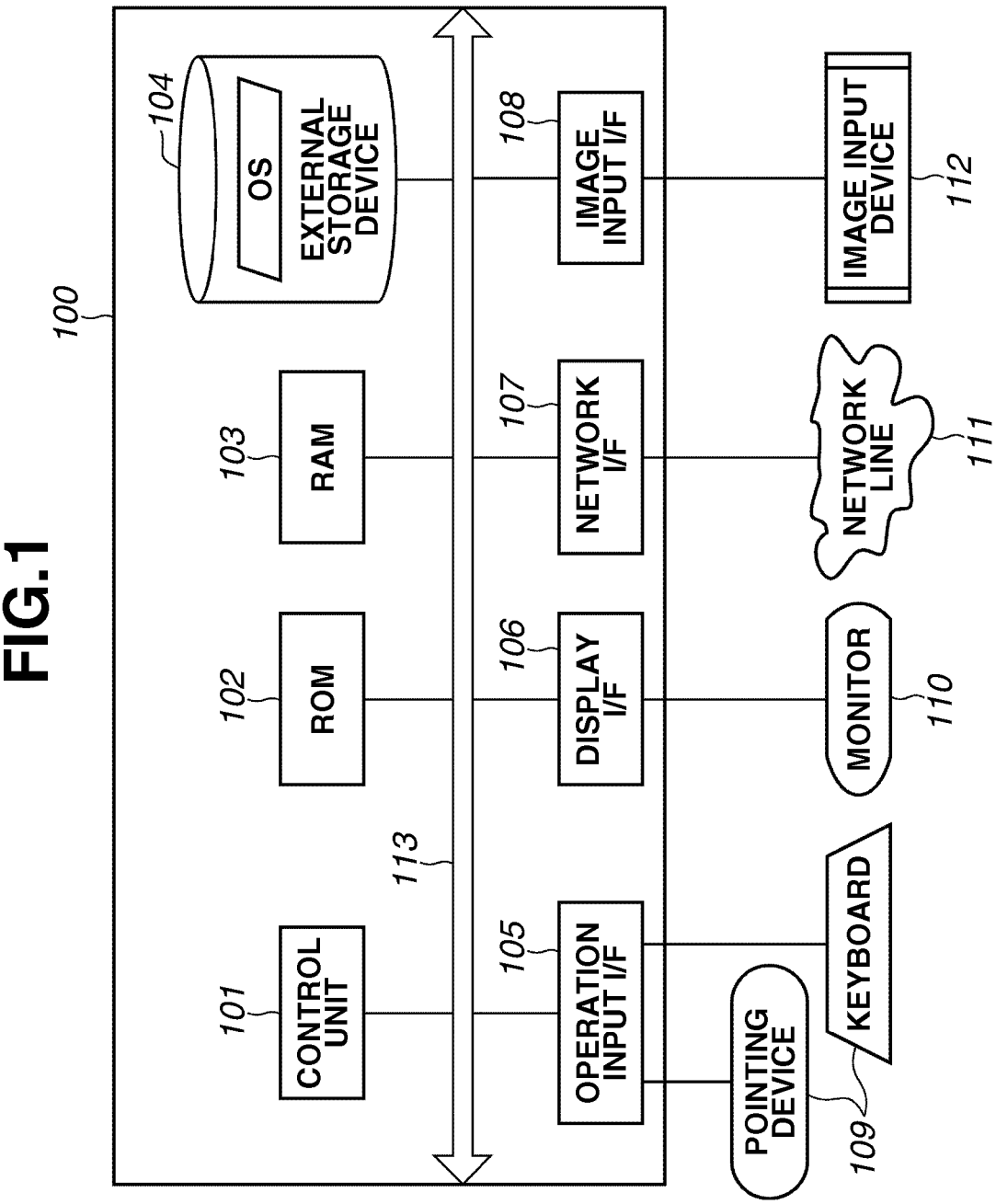
FIG. 1 is a block diagram illustrating an example of a configuration of an image processing apparatus according to an exemplary embodiment.

In FIG. 1, an image processing apparatus 100 includes a control unit 101 such as a central processing unit (CPU) that controls the entire image processing apparatus 100. The image processing apparatus 100 further includes a read-only memory (ROM) 102 and a random access memory (RAM) 103. The ROM 102 stores programs and parameters which need not to be changed. The RAM 103 temporarily stores programs and data pieces which are supplied from an external apparatus or the like.

The image processing apparatus 100 further includes an external storage device 104, such as a hard disk fixedly disposed in the image processing apparatus 100 or a memory card that may be attached to and detached from the image processing apparatus 100. The external storage device 104 stores an operating system (OS) and an image management application software program (which will hereinafter be referred to as "image management application"). The control unit 101 reads the OS and the image management application from the external storage device 104 and activates them. Based on the OS and application, the control unit 101 operates and controls other units to realize the present exemplary embodiment. In addition, the external storage device 104 stores moving image files and still image files associated with hierarchically-structured folders.

The image processing apparatus 100 further includes an operation unit interface 105, a display interface 106, and a network interface 107. The operation unit interface 105 is connected to an operation unit 109 (an input device such as a pointing device or a keyboard) receiving user operation to input data. The display interface 106 is connected to a monitor 110 displaying data stored in the image processing apparatus 100 and supplied data. The network interface 107 connects the image processing apparatus 100 to a network line 111 such as the Internet. A system bus 113 connects the above-described units 101 to 107 to communicate with each other. An image input device 112 is connected to an image input interface 108.

Figure 2:
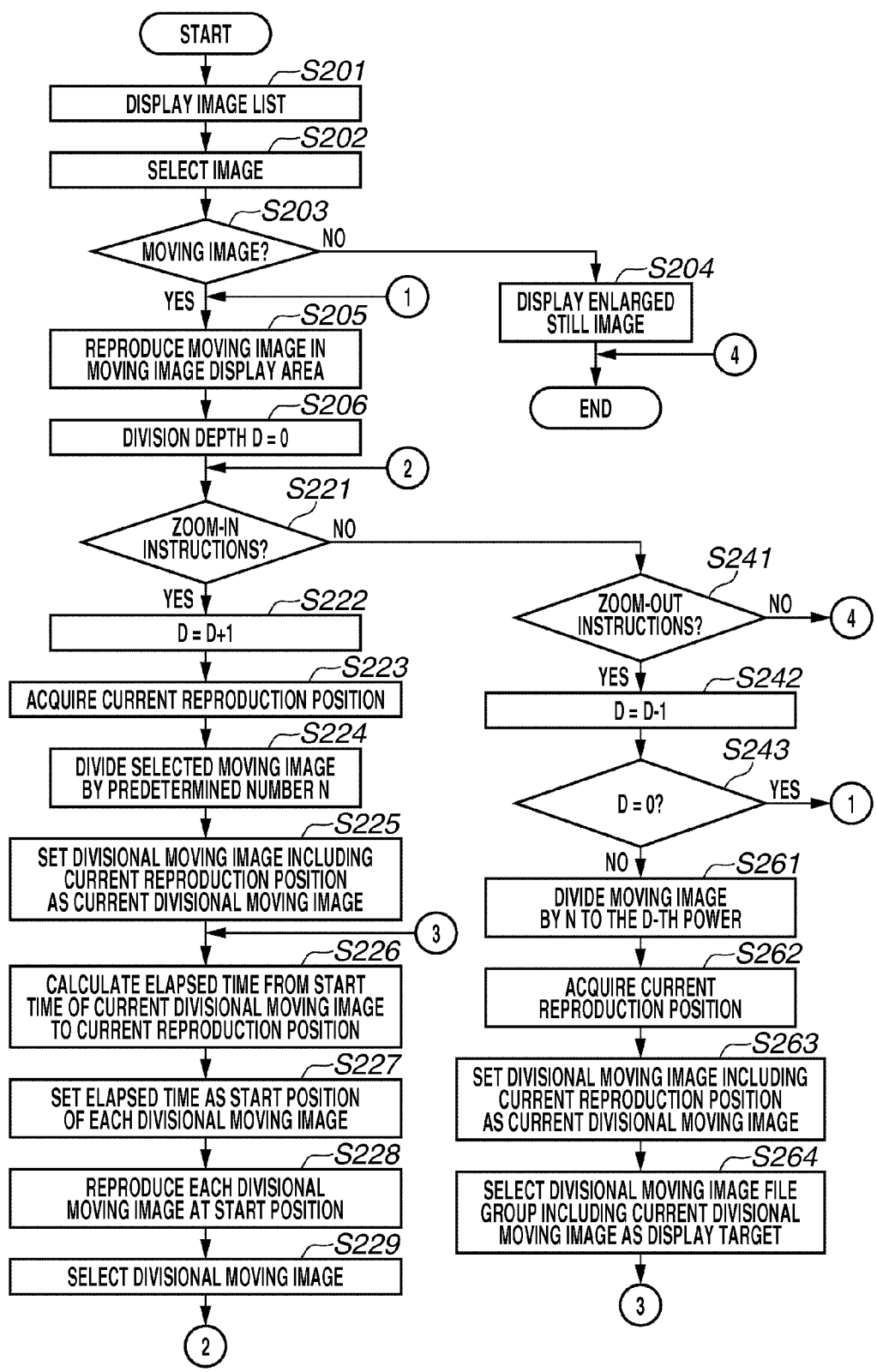
FIG. 2 is a flow chart illustrating an example of an operation of the image processing apparatus according to the exemplary embodiment.

Next, an operation of the image processing apparatus 100 will be described with reference to a flow chart in FIG. 2. First, in operation S201, the control unit 101 reads and activates the image management application and displays a window 300 on the monitor 110.

Figure 3A:
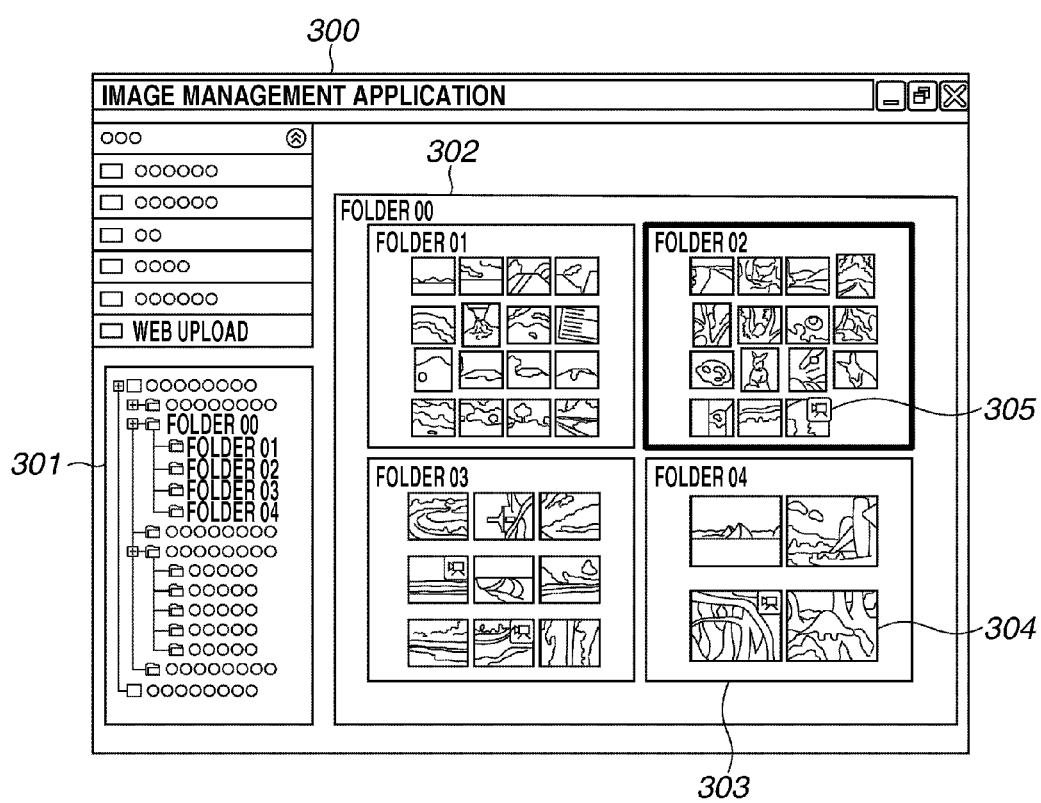
FIGS. 3A and 3B illustrate examples of screens according to the exemplary embodiment.

FIG. 3A illustrates an example of the window 300 displayed on the monitor 110 in operation S201. A folder tree 301 displays a folder structure including moving and still image files stored in the external storage device 104.

An upper-layer folder area 302 includes a plurality of lower-layer folder areas 303 corresponding to lower-layer folders directly belonging to a predetermined upper-layer folder. For example, the predetermined upper-layer folder is a folder specified by a user from among folders displayed in the folder tree 301.

The lower-layer folder areas 303 display thumbnail images 304 and 305, which respectively correspond to still image files and moving image files belonging to the lower-layer folders. An icon displayed near the moving-image-file correspondence thumbnail image 305 indicates that the thumbnail image 305 corresponds to a moving image file.

Figure 3B:
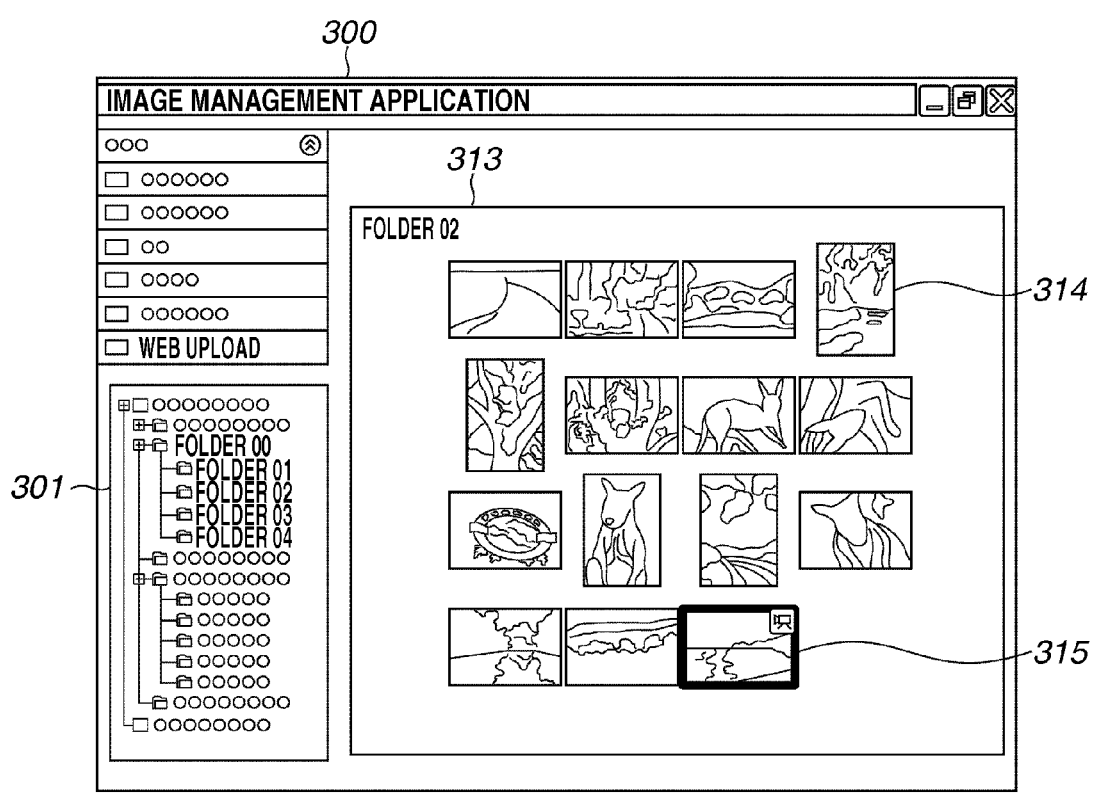

If the user selects one of the lower-layer folder areas 303 displayed in the window 300 in FIG. 3A, the control unit 101 displays a selected lower-layer folder area 313 as illustrated in FIG. 3B. The lower-layer folder area 313 displays thumbnail images 314 and 315 which respectively correspond to still image files and moving image files belonging to the selected lower-layer folder.

In operation S202, the control unit 101 selects a thumbnail image displayed in the window 300 in FIG. 3A or 3B, in accordance with the user operation.

In operation S203, the control unit 101 determines whether the selected thumbnail image corresponds to a moving image file. If the selected thumbnail image does not correspond to a moving image file (NO in operation S203), the processing proceeds to operation S204. In operation S204, the control unit 101 reads a still image file corresponding to the selected thumbnail image from the external storage device 104 and displays the corresponding enlarged still image in a display area in the window 300.

Figure 4A:
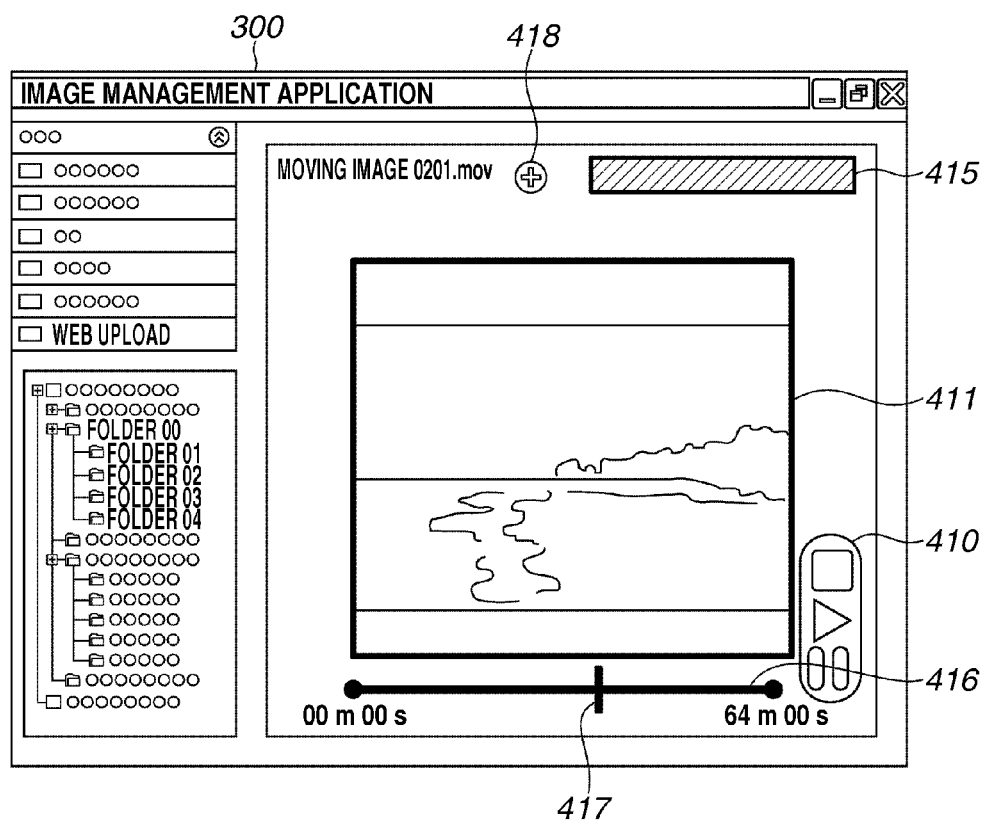
FIGS. 4A to 4C illustrate examples of screens according to the exemplary embodiment.

Whereas, if the selected thumbnail image corresponds to a moving image file (YES in operation S203), then in operation S205, the control unit 101 reads the moving image file corresponding to the thumbnail image from the external storage device 104 and reproduces a moving image in the window 300, as illustrated in FIG. 4A.

FIG. 4A illustrates an example of the window 300 displayed on the monitor 110 in operation S205. In a moving image display area 411, the moving image file corresponding to the thumbnail image selected in operation S202 is reproduced. A reproduction guide 415 displays which part of the entire moving image file is a reproduction target in the moving image display area 411. In FIG. 4A, since the entire moving image file is the reproduction target in the moving image display area 411, the entire reproduction guide 415 is highlighted by a thick frame.

A reproduction time bar 416 represents the entire reproduction time of the moving image file as the reproduction target in the moving image display area 411. A slider 417 on the reproduction time bar 416 indicates the current reproduction position. If the user moves the slider 417, the reproduction position is changed. The user may use a zoom-in icon 418 to divide the moving image file as the reproduction target in the moving image display area 411 and to reproduce divisional moving image files.

The user may use reproduction control icons 410 to stop, pause, and resume reproduction of the moving image file in the moving image display area 411. In FIG. 4A, since the user may not zoom out the moving image, which is described below, a zoom-out icon is not displayed.

In operation S206, the control unit 101 executes initialization by assigning zero (0) to a division depth D. In operation S221, the control unit 101 determines whether the user has input a zoom-in instruction. The user may use the operation unit 109 and click the zoom-in icon 418 to input the zoom-in instruction.

If the control unit 101 receives the zoom-in instruction (YES in operation S221), then in operation S222, the control unit 101 adds 1 to the division depth D. In operation S223, the control unit 101 acquires the current reproduction position of the moving image file in the moving image display area 411.

In operation S224, the control unit 101 divides the selected moving image file by a predetermined number N to generate N pieces of divisional moving image files. The predetermined number N is set in the image management application in advance, and the user may change the predetermined number N.

In operation S225, among the N pieces of the divisional moving image files, the control unit 101 sets the divisional moving image file including the current reproduction position acquired in operation S223 as a current divisional moving image. In operation S226, the control unit 101 calculates the elapsed time from the beginning of the current divisional moving image to the current reproduction position.

In operation S227, the control unit 101 sets the start position of each of the divisional moving image files from the beginning thereof to the position corresponding to the elapsed time calculated in operation S226. In operation S228, the control unit 101 simultaneously starts reproduction of the individual divisional moving image files.

Hereinafter, the description will be made, assuming that the reproduction time of the entire moving image file is 64 minutes and the predetermined number N is 4. In FIG. 4A, the entire moving image file is the reproduction target in the moving image display area 411.

In this case, in operation 224, the control unit 101 divides the entire moving image file by the predetermined number 4 and generates four divisional moving image files each containing a 16-minute moving image, i.e., from the beginning to 16 minutes, 16 to 32 minutes, 32 to 48 minutes, and 48 minutes to the end.

In operation S223, if the control unit 101 acquires the current reproduction position at 40 minutes, in operation S226, the control unit 101 calculates that the elapsed time is 8 minutes. Then in operation S227, the control unit 101 sets positions after 8 minutes from the beginning of each of the individual divisional moving image files in the moving image display areas 421 to 424 as the respective reproduction start positions. Namely, the control unit 101 sets 8 minutes, 24 minutes, 40 minutes, and 56 minutes as the respective reproduction start positions.

Thus, even when reproducing these divisional moving image files, the user may start viewing the image at the reproduction position before the image is divided. Thus, since the user may continue checking a scene, operational continuity may be maintained. As a result, the user may easily search for a scene of interest.

Figure 4B:
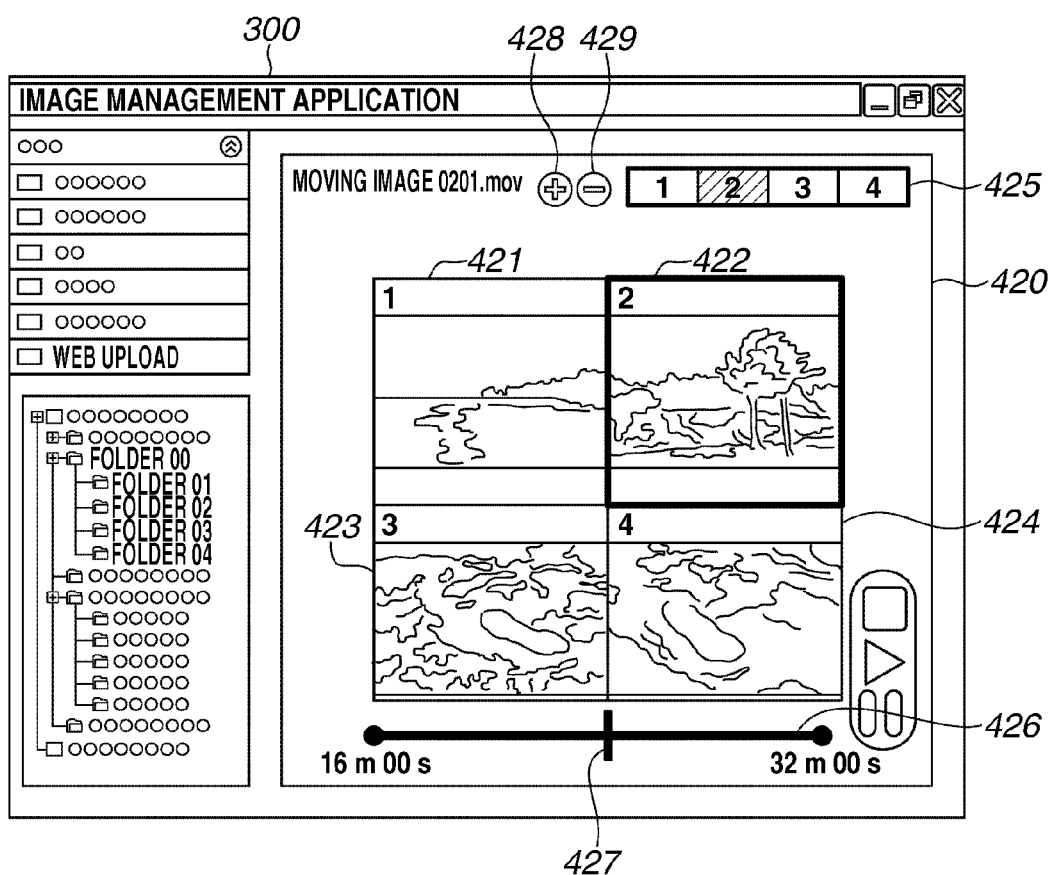

FIG. 4B illustrates an example of the window 300 displayed on the monitor 110 in operation S228. The divisional moving image files are displayed in the respective moving image display areas 421 to 424, and numbers indicating the order of the divisional moving image files are displayed near the respective moving image display areas. Only the moving image file displayed in the selected moving image display area reproduces sound. In this way, since sound of a single moving image file is reproduced, the user may easily listen to the sound of the selected moving image file.

A reproduction guide 425 indicates the part of the divisional moving image files as the reproduction targets displayed in the moving image display areas 421 to 424 among the entire moving image. In FIG. 4B, since the divisional image files that are obtained by dividing the entire moving image file are the reproduction targets in the moving image display areas 421 to 424, the entire reproduction guide 425 is highlighted by a thick frame. In addition, the reproduction guide 425 displays parting lines to indicate divided positions corresponding to the divisional moving image files in the entire moving image file. These parting lines indicate positions of 16 minutes, 32 minutes, and 48 minutes from the beginning of the moving image file.

The reproduction guide 425 also displays a number in each of the blocks, and these numbers correspond to the numbers displayed near the moving image display areas 421 to 424. In addition, if the user selects one of the moving image display areas 421 to 424, the control unit 101 highlights the selected moving image display area and a corresponding block in the reproduction guide 425.

In FIG. 4B, the moving image display area 422 is selected and highlighted by a thick frame, and the block 2 in the reproduction guide 425 is highlighted by diagonal lines. By checking such display, the user may check where the divisional moving image file as the reproduction target in the moving image display areas 421 to 424 is located in the entire moving image file.

A reproduction time bar 426 indicates the entire reproduction time of each of the divisional moving image files as the reproduction targets in the moving image display areas 421 to 424. In the present exemplary embodiment, the reproduction time is 16 minutes. A slider 427 on the reproduction time bar 426 indicates the current reproduction position common to each of the divisional moving image files. If the user moves the slider 427, the reproduction position of each of the divisional moving image files is changed simultaneously. In addition, the start time 16 minutes and the end time 32 minutes of the divisional moving image file as the reproduction target in the selected moving image display area 422 are displayed near the reproduction time bar 426.

By selecting one of the moving image display areas 421 to 424 and pressing a zoom-in icon 428, the user may further divide a corresponding divisional moving image file by the predetermined number. In this way, the user may reproduce further divisional moving images. The user may use a zoom-out icon 429 to integrate the divisional moving image files as the reproduction targets in the moving image display areas 421 to 424. In this way, the user may reproduce an integrated moving image.

In S229, the control unit 101 detects that the user has selected one of the moving image display areas 421 to 424. Then, the control unit 101 returns the processing to operation S221.

Hereinafter, the present exemplary embodiment will be described, assuming that the user judges that a desired scene is included in the divisional moving image file currently being reproduced in the moving image display area 422 and selects the moving image display area 422 in operation S229.

In such a case, in operation S223, the control unit 101 acquires the current reproduction position of the divisional moving image file in the moving image display area 422. In addition, in operation S224, the control unit 101 divides the divisional moving image file in the moving image display area 422 by the predetermined number N to generate secondary divisional moving image files. In operation S228, the window 300 as illustrated in FIG. 4C is displayed on the monitor 110.

Figure 4C:
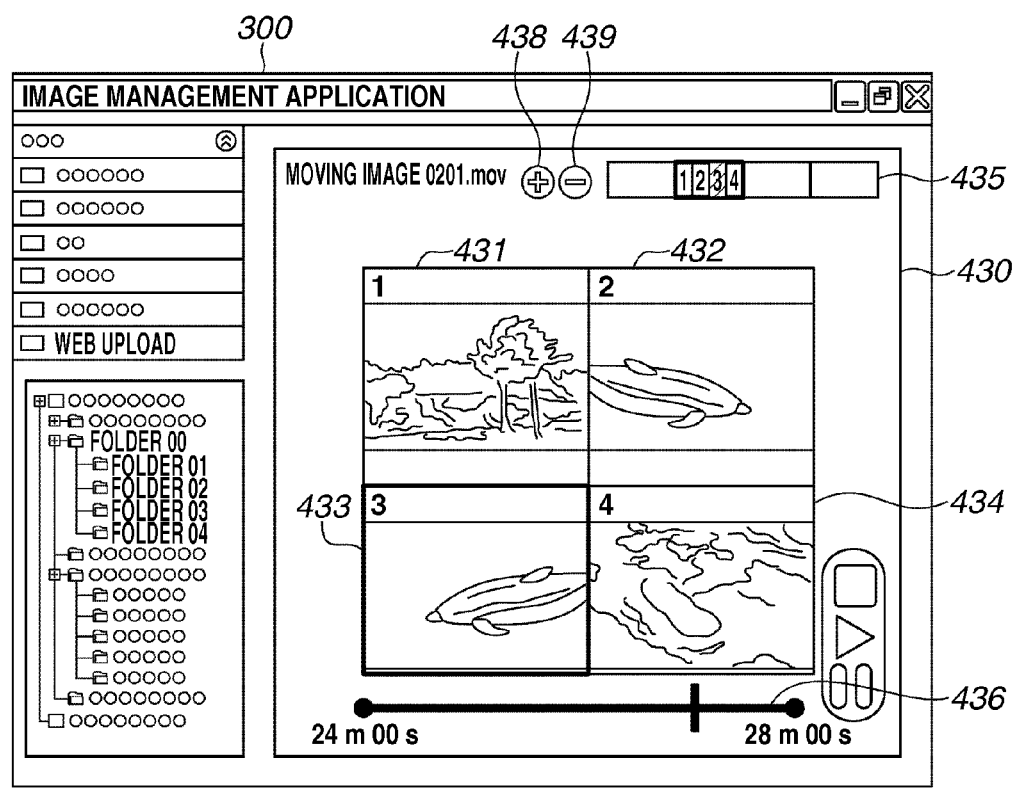

In FIG. 4C, the individual divisional moving image files are reproduced in respective moving image display areas 431 to 434, and numbers indicating the order of the divisional moving image files corresponding to the moving image display area 422 are displayed near the moving image display areas 431 to 434. A reproduction guide 435 displays where the divisional moving image files as the reproduction targets in the moving image display areas 431 to 434 are located in the divisional moving image file in the moving image display area 422.

In FIG. 4C, the moving image display areas 431 to 434 reproduce the divisional moving image files obtained by dividing the divisional moving image file in the moving image display area 422. Thus, in the entire reproduction guide 435, portions corresponding to the divisional moving image file in the moving image display area 422 are highlighted by a thick frame.

In addition, the reproduction guide 435 displays parting lines to indicate divided positions corresponding to the divisional moving image files of the divisional moving image file in the moving image display area 422. In this case, each of the divisional moving image files is 4 minutes long. The parting lines indicate time 20 minutes, 24 minutes, and 28 minutes from the beginning of the moving image file. Further, the reproduction guide 435 also displays a number in each of the blocks, and these numbers correspond to the numbers displayed near the moving image display areas 431 to 434.

If the user selects one of the moving image display areas 431 to 434, the control unit 101 highlights the selected moving image display area and a corresponding block in the reproduction guide 435. In FIG. 4C, the moving image display area 433 is selected and highlighted by a thick frame, and the block 3 in the reproduction guide 435 is highlighted by diagonal lines.

A reproduction time bar 436 indicates the entire reproduction time of each of the divisional moving image files as the reproduction targets in the moving image display areas 431 to 434. In the present exemplary embodiment, the reproduction time is 4 minutes. A slider 437 on the reproduction time bar 436 indicates the current reproduction position common to each of the divisional moving image files. If the user moves the slider 437, the reproduction position of each of the divisional moving image files is changed simultaneously. In addition, the start time 24 minutes and the end time 28 minutes of the divisional moving image file as the reproduction target in the selected moving image display area 433 are displayed near the reproduction time bar 436.

By repeating a zoom-in operation in this way, the user may narrow down moving image files of the reproduction targets and find one including a desired scene. Further, since the reproduction time is sequentially shortened from 64 minutes to 16 minutes and to 4 minutes, the user may quickly search for a desired scene more easily.

If the control unit 101 receives no zoom-in instruction (NO in operation S221), the processing proceeds to operation S241. In operation S241, the control unit 101 determines whether the user has input a zoom-out instruction. If the zoom-out instruction is input (YES in operation S241), then in operation S242, the control unit 101 subtracts 1 from the division depth D. In operation S243, the control unit 101 determines whether the division depth D is 0.

If the division depth D is 0 (YES in S243), the control unit 101 returns the processing to operation S205.

If not (NO in operation S243), then in operation S261, the control unit 101 divides the entire moving image file by the predetermined number N to the division depth D-th power.

In operation S262, the control unit 101 acquires the current reproduction position of the divisional moving image file. In operation S263, the control unit 101 sets the divisional moving image file including the current reproduction position as the current divisional moving image. In operation S264, a divisional moving image file group including the current divisional moving image is selected as a display target. Then, the control unit 101 advances the processing to operation S226.

The divisional moving image files, which are obtained by dividing the entire moving image file by the predetermined number N to the division depth D-th power in operation S261, are separated into divisional moving image file groups, each including N moving images, sequentially from the beginning of the entire moving image. Subsequently, in operation S264, the divisional moving image file group as the display target is selected from the groups.

If the control unit 101 receives no zoom-out instruction (NO in operation S241), the control unit 101 ends the processing.

An operation of dividing a moving image file executed in response to the zoom-in or zoom-out instruction will be described with reference to FIG. 5. When the division depth D is zero, if the control unit 101 receives the zoom-in instruction, the control unit 101 increments the division depth D by 1. As a result, four divisional moving image files 511 to 514 are displayed in the window 300.

If the user selects the divisional moving image file 512 and issues the zoom-in instruction, the control unit 101 increments the division depth D to 2. As a result, divisional moving image files 521 to 524 are displayed in the window 300.

If the user selects the divisional moving image file 523 and issues the zoom-in instruction, the control unit 101 increments the division depth D to 3. As a result, divisional moving image files 531 to 534 are displayed in the window 300. In this state, if the user issues the zoom-out instruction, the control unit 101 decrements the division depth D to 2, a group of divisional moving image files including the divisional moving image files 531 to 534 is selected and displayed in the window 300.

Thus, if the moving image files as the reproduction targets do not include a scene desired by the user, the user may easily change the moving image files and start a new search by executing the zoom-out operation.

Aspects of the embodiments may also be realized by a computer of a system or apparatus (or devices such as a central processing unit (CPU) or a micro processing unit (MPU)) that reads out and executes a program recorded on a memory device to perform the functions of the above-described embodiment(s), and by a method, the operations of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Further, the present exemplary embodiment may also be realized by supplying software (e.g., a program or a set of instructions) for realizing the functions of the above exemplary embodiments to a system or an apparatus via a network or via various storage media, and having a CPU or an MPU of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a moving image, divisional moving images). In addition, the operations in the method transform the elements or parts from one state to another state. The transformation is particularized and focused on reproducing a moving image. The transformation provides a different function or use such as dividing a moving image, reproducing the plurality of divisional moving images, receiving an instruction, acquiring a reproduction position, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the embodiments are not limited to the disclosed exemplary embodiments. The scope of the following claims is to be accorded the broadest interpretation so as to encompass all modifications, equivalent structures, and functions.

This application claims priority from Japanese Patent Application No. 2011-026356 filed Feb. 9, 2011, which is hereby incorporated by reference herein in its entirety.

What is claimed is:

1. A moving image reproducing apparatus comprising:
   a division unit configured to temporally divide a moving image file into a plurality of first divisional moving image files having equal time intervals;
   a reproduction unit configured to simultaneously reproduce the first divisional moving image files which were temporally divided;
   a selection unit configured to select one of the first divisional moving image files, while the reproduction unit reproduces the first divisional moving image files, in response to a user's instruction;
   an acquisition unit configured to acquire a reproduction position of the selected first divisional moving image file in response to the user's instruction;
   a searching unit configured to search one of a plurality of second divisional moving image files from among the plurality of second divisional moving image files acquired by dividing the selected first moving image file by said division unit, including the acquired reproduction position of the selected first divisional moving image file; and
   a calculation unit configured to calculate time between a beginning position of the searched second divisional moving image file and a position of the searched second divisional moving image file corresponding to the acquired reproduction position of the selected first divisional moving image file, wherein the reproduction unit starts the reproduction of the plurality of second divisional moving image files from a position where the calculated time has elapsed from a beginning position of each of the second divisional moving image files simultaneously.

2. The moving image reproducing apparatus according to claim 1, further comprising:
   a change unit configured to simultaneously change reproduction positions of the plurality of divisional moving image files that are being reproduced, in response to an instruction input via an operation unit.

3. The moving image reproducing apparatus according to claim 1, further comprising:
   a display unit configured to display a guide indicating reproduction positions of a plurality of divisional moving image files that are being reproduced by the reproduction unit, on a time bar representing an entire moving image file.

4. The moving image reproducing apparatus according to claim 1,
   wherein, while the reproduction unit reproduces sound of one of the plurality of divisional moving image files, the reproduction unit does not reproduce sound of the other divisional moving image files.

5. A method for reproducing a moving image file, the method comprising:
   dividing temporally a moving image file into a plurality of first divisional moving image files having equal time intervals;
   reproducing simultaneously the first plurality of divisional moving image files which were temporally divided;
   selecting one of the first divisional moving image files, while reproducing the first divisional moving image files, in response to a user's instruction;
   acquiring a reproduction position of the selected first divisional moving image file in response to the user's instruction;
   searching one of a plurality of second divisional moving image files from among the plurality of second divisional moving image files acquired by dividing the selected first moving image file, including the acquired reproduction position of the selected first divisional moving image file; and
   calculating time between a beginning position of the searched second divisional moving image file and a position of the searched second divisional moving image file corresponding to the acquired reproduction position of the selected first divisional moving image file, wherein the reproduction of the plurality of second divisional moving image files starts from a position where the calculated time has elapsed from a beginning position of each of the second divisional moving image files simultaneously.

6. A computer-readable storage medium storing a program that, when executed by a processor, cause the processor to perform operations comprising:
   dividing temporally a moving image file into a plurality of first divisional moving image files having equal time intervals;
   reproducing simultaneously the first plurality of divisional moving image files were temporally divided;
   selecting one of the first divisional moving image files, while reproducing the first divisional moving image files, in response to a user's instruction;
   acquiring a reproduction position of the selected first divisional moving image file in response to the user's instruction;

searching one of a plurality of second divisional moving image files from among the plurality of second divisional moving image files acquired by dividing the selected first moving image file, including the acquired reproduction position of the selected first divisional moving image file; and calculating time between a beginning position of the searched second divisional moving image file and a position of the searched second divisional moving image file corresponding to the acquired reproduction position of the selected first divisional moving image file, wherein the reproduction of the plurality of second divisional moving image files starts from a position where the calculated time has elapsed from a beginning position of each of the second divisional moving image files simultaneously.

\* \* \* \* \*